United States Patent
Yu et al.

(10) Patent No.: US 11,463,652 B2
(45) Date of Patent: Oct. 4, 2022

(54) WRITE-A-MOVIE: VISUALIZE YOUR STORY FROM SCRIPT

(71) Applicant: TCL RESEARCH AMERICA INC., San Jose, CA (US)

(72) Inventors: Zixiao Yu, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 39 days.

(21) Appl. No.: 17/137,252

(22) Filed: Dec. 29, 2020

(65) Prior Publication Data
US 2022/0210366 A1 Jun. 30, 2022

(51) Int. Cl.
| | |
|---|---|
| H04N 7/01 | (2006.01) |
| H04N 21/234 | (2011.01) |
| G06F 16/483 | (2019.01) |
| G06F 16/435 | (2019.01) |
| H04N 21/218 | (2011.01) |

(52) U.S. Cl.
CPC ......... *H04N 7/0127* (2013.01); *G06F 16/435* (2019.01); *G06F 16/483* (2019.01); *H04N 21/21805* (2013.01); *H04N 21/23418* (2013.01)

(58) Field of Classification Search
CPC ........... H04N 7/0127; H04N 21/21805; H04N 21/23418; G06F 16/435; G06F 16/483
See application file for complete search history.

(56) References Cited

U.S. PATENT DOCUMENTS

| | | | | |
|---|---|---|---|---|
| 11,205,458 B1 * | 12/2021 | Torres | ................... | H04N 5/2222 |
| 2015/0095957 A1 * | 4/2015 | Ravi | ................... | H04N 21/4398 |
| | | | | 725/87 |

OTHER PUBLICATIONS

Michael Rabiger, "Directing Film techniques and Aesthetics," Fourth Edition, Published by Elsevier, Inc., Focal Press, 2007.
The United States Patent and Trademark Office (USPTO) Co-Pending U.S. Appl. No. 17/035,443, filed Sep. 28, 2020.
Luisa Verdoliva, "Media Forensics and DeepFakes: an overview," arXiv:2001.06564v1 [cs.CV] Jan. 18, 2020.
"The Shining starring Jim Carrey : Episode 3—Here's Jimmy! [DeepFake]," Jul. 12, 2019, https://www.youtube.com/watch?v=Dx59bskG8dc&t=2s.
"[SIGGRAPH 2020] Example-Driven Virtual Cinematography by Learning Camera Behaviors," Jun. 4, 2020, https://www.youtube.com/watch?v=xwHdChwNi8s.
Hongda Jiang et al., "Example-driven Virtual Cinematography by Learning Camera Behaviors," ACM Trans. Graph., vol. 39, No. 4, Article 1. Publication date: Jul. 2020.
Q. Galvane, "Automatic Cinematography and Editing in Virtual Environments," Graphics, Grenoble 1 UJF—Universite Joseph Fourier, 2015.
Amaury Louarn et al., "Automated Staging for Virtual Cinematography," MIG '18, Nov. 8-10, 2018, Limassol, Cyprus.
The United States Patent and Trademark Office (USPTO) Co-Pending U.S. Appl. No. 16/727,778, filed Dec. 26, 2019.
"Quickcut an Interactive Tool for Editing Narrated Video," Oct. 4, 2016, https://www.youtube.com/watch?v=pJURLzFqUDk.
Anh Truong et al., "QuickCut: An Interactive Tool for Editing Narrated Video," UIST 2016.
Miao Wang et al. "Write-A-Video: Computational Video Montage from Themed Text," ACM Trans. Graph., vol. 38, No. 6, Article 177. Publication date: Nov. 2019.

(Continued)

*Primary Examiner* — Nam D Pham
(74) *Attorney, Agent, or Firm* — Anova Law Group, PLLC (57) ABSTRACT

A script-to-movie generation method for a computing device includes obtaining a movie script, generating a video according to the movie script, optimizing the generated video until a pass condition is satisfied, and outputting the optimized video.

18 Claims, 3 Drawing Sheets

(56) References Cited

OTHER PUBLICATIONS

H. Subramonyam et al., "TakeToons: Script-driven Performance Animation," Session 12: Modeling and Animation, UIST 2018, Oct. 14, 17, 2018, Berlin, Germany.
Lianli Gao et al., "Video Captioning with Attention-based LSTM and Semantic Consistency," DOI 10.1109/TMM.2017.2729019, IEEE Transactions on Multimedia.
Kenton Lee et al., "End-to-end Neural Coreference Resolution," arXiv:1707.07045v2 [cs.CL] Dec. 15, 2017.
Mackenzie Leake et al., "Computational Video Editing for Dialogue-Driven Scenes," ACM Transactions on Graphics, vol. 36, No. 4, Article 130. Publication date: Jul. 2017.
Neel Joshi et al., "Real-Time Hyperlapse Creation via Optimal Frame Selection," 2015.
Ido Arev et al., "Automatic Editing of Footage from Multiple Social Cameras," The Interdisciplinary Center, Herzlia Efi Arazi School of Computer Science, Nov. 2015.
Rachel Heck et al., "Virtual Videography," ACM Transactions on Multimedia Computing, Communications and Applications, vol. 3, No. 1, Article 4, Publication date: Feb. 2007.
Chao Liang et al., "Script-to-Movie: A Computational Framework for Story Movie Composition," IEEE Transactions an Multimedia, vol. 15, No. 2, Feb. 2013.
Jeffrey Pennington et al., "GloVe: Global Vectors forWord Representation," Proceedings of the 2014 Conference on Empirical Methods in Natural Language Processing (EMNLP), pp. 1532-1543, Oct. 25-29, 2014, Doha, Qatar.
Christophe Lino et al., "Efficient Composition for Virtual Camera Control," Eurographics/ ACM SIGGRAPH Symposium on Computer Animation (2012).
Roy Thompson et al., "Grammar of the Shot," Second Edition, Published by Elsevier, Inc., Focal Press, 2009.
James E. Cutting et al., "Attention and the Evolution of Hollywood Film," Psychological Science, vol. 21, No. 3 (Mar. 2010), pp. 432-439.

\* cited by examiner

WRITE-A-MOVIE: VISUALIZE YOUR STORY FROM SCRIPT

FIELD OF THE DISCLOSURE

The present disclosure relates to the field of computer graphics technologies and, more particularly, relates to a method and device for automatic script-to-movie generation.

BACKGROUND

In traditional movie industry, screenplay writing (i.e., movie script) and filmmaking are completely separate processes. The nascent Write-A-Movie technology automatically generates a video according to a movie script to substantially improve the movie production efficiency. However, the automatically generated video often does not sufficiently reflect the movie script.

The present disclosure provides a script-to-movie generation method that incorporates a novel evaluation mechanism, which combines the comprehensibility of the visual presentation of the movie script and the compliance of the cinematographic guidelines. As such, the script-to-movie generation process is mapped into an optimization problem to improve the quality of the automatically generated video. In the meantime, dynamic programming is incorporated in solving the optimization problem to reduce the computation complexity and shorten the movie production time.

BRIEF SUMMARY OF THE DISCLOSURE

One aspect of the present disclosure provides a script-to-movie generation method for a computing device. The method includes obtaining a movie script, generating a video according to the movie script, optimizing the generated video until a pass condition is satisfied; and outputting the optimized video.

Another aspect of the present disclosure provides a script-to-movie generation device. The device includes a memory storing program instructions, and a processor coupled with the memory and configured to execute the program instructions to: obtain a movie script, generate a video according to the movie script, optimize the generated video until a pass condition is satisfied; and outputting the optimized video.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The write-a-movie technology is an adaptive self-reinforcing movie auto-generation framework, which automatically generates a video from a movie script. The present disclosure provides a script-to-movie generation device that leverages recent advances in natural language processing, computational cinematography, and video understanding. The automatic workflow of the script-to-movie generation device dramatically reduces the time and knowledge required for the script-to-movie generation process. By incorporating a novel hybrid objective evaluation mechanism that considers both the comprehensibility of visual presentation of the movie script and the compliance of cinematography guidelines, the video generation process has been mapped into an optimization problem that aims to produce better quality videos. Dynamic programming has been considered to solve the optimization problem and achieve an optimal solution with the most efficient computation complexity. Thus, the script-to-movie generation device consistent with the present disclosure substantially expedites the movie production process.

In the traditional movie industry, screenplay writing and film making are completely separate processes. With the recent development of artificial intelligence technology, a substantial portion of the film making process can be achieved by computers. Bridging screenplay writing and film making brings immediate benefits to all parties involved. The script writes can visualize their product and edit before submitting. The producers can screen the movie scripts by seeing pre-visualized version instead of reading hundreds of pages of movie scripts. The script-to-movie generation device needs to satisfy two quality requirements. On one hand, the output movie maintains reasonable fidelity of the movie script. On the other hand, the output movie follows cinematic rules with cinematographic aesthetics.

Therefore, a mechanism is needed to evaluate the fidelity of the generated video to the corresponding movie script and pass the feedback to the animation and cinematographic process for further improvement if the evaluated fidelity is below the bar for acceptance. As such, the computational cinematography process needs to consider not only the aesthetics but also the perception from the movie script fidelity perspective. Although the state-of-the-art of today's video understanding capability has not reached the satisfaction for accurately evaluating the fidelity of the generated video to the movie script, it is reasonably sufficient to evaluate certain types of movies, where the scene complexity and activity recognition are less challenging.

In the embodiments of the present disclosure, the script-to-movie generation device automatically converts a movie script to a movie, such as an animation movie. The script-to-movie generation device includes an arbitration mechanism backed by the video understanding technology that converts the generated video to a list of performed actions and the natural language understanding technology that converts the movie script to a list of intended actions, such that the comprehensibility of the generated video and the fidelity to the movie script can be determined. The evaluation result is then fed back to stage performance to refine the quality of the generated video. Moreover, the aesthetics and the fidelity requirements are combined in a unified evaluation framework and the video quality improvement process is mapped into an optimization problem that adjusts camera setting and character action setting to achieve the desired video quality. The optimization problem is designed such that the it can be solved by dynamic programming to reduce the computation complexity.

Figure 1:
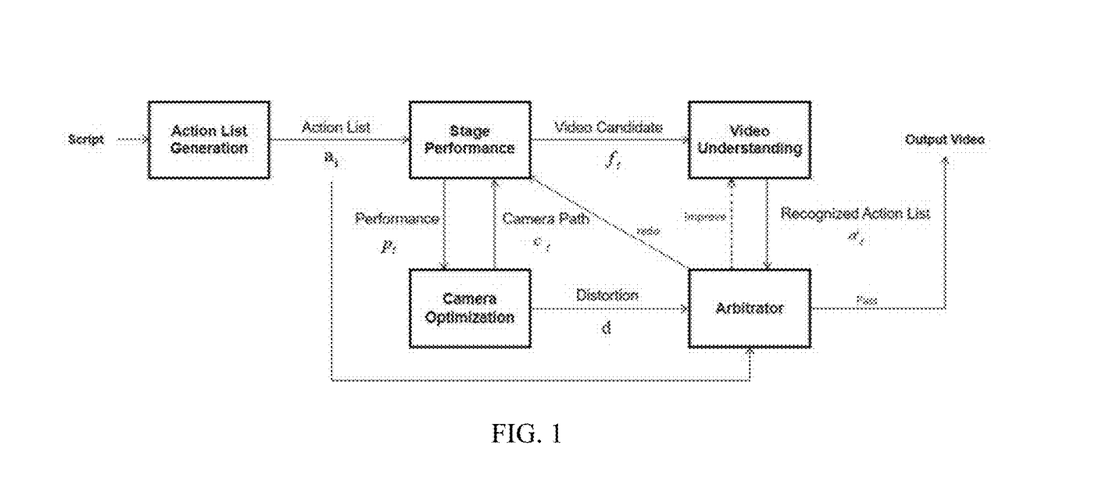
FIG. 1 illustrates a schematic functional diagram of an exemplary script-to-movie generation device according to some embodiments of the present disclosure.

FIG. 1 illustrates a schematic functional diagram of an exemplary script-to-movie generation device according to some embodiments of the present disclosure. As shown in FIG. 1, the script (i.e., the movie script) is inputted into an action list generation process to generate a chronological action list. The action list includes a list of intended actions represented by $\{a_i | i=1, 2, \ldots, N\}$, where $a_i$ is ith action object that contains information for one or more virtual characters in a scene of stage performance and N is the total number of action objects performed by various characters in various scenes of the stage performance. The action list $\{a_i | i=1, 2, \ldots, N\}$ is a collection of action objects configured to generate character performance in a stage performance process and sorted in time order without overlapping with each other. For example, the characters are virtual characters in an animation movie. In some embodiments, multiple characters perform simultaneously so that an action object contains multiple characters in the same scene. For example, two people are fighting with each other, or a mother is hugging her daughter.

In some embodiments, each action in the action list $\{a_i | i=1, 2, \ldots, N\}$ includes attributes, such as a subject, an action, an object, an action duration, a subject start position, a subject end position, a subject emotion, and an action style. The subject start position is the subject position at the beginning of the action. The subject end position is the subject position at the end of the action. The default value of the subjection emotion is neutral. The default value of the action style is neutral (i.e., no preference style). A user can choose one action style from: self-action (when the camera focuses on the subject), multi-action (when the camera focuses both the subject and the object), and environment-action (when the camera focuses on the environment around the subject, such as a view around action).

Referring to FIG. 1, the action list $\{a_i | i=1, 2, \ldots, N\}$ is inputted into the stage performance process to generate a video. In the stage performance process, the inputted action list $\{a_i | i=1, 2, \ldots, N\}$ is converted into corresponding stage performance data represented by $\{p_t | t=1, 2, \ldots, T\}$, where $p_t$ is the stage performance by a character at time t and T is a total performance time. The character performances $\{p_t | t=1, 2, \ldots, T\}$ in three-dimensional scenes are continuous. However, due to computation power limitation, the continuous information is transformed to discrete information for camera optimization. The stage performance data are recorded every time unit (e.g., half second) as one element in $p_t$. In the specification, the stage performance, the stage performance data, and the character performances are used interchangeably.

For each action in the action list $\{a_i | i=1, 2, \ldots, N\}$, the corresponding performance data is represented by $$\left\{ p_{t_{a_i}}, \ldots, p_{t+1_{a_i}}, \ldots, p_{t+l_{a_i}} \right\},$$

where $l_{a_i}$ is the action duration of $a_i$, and $t_{a_i}$ and $l_{a_i}$ are fixed values derived from the action list $\{a_i | i=1, 2, \ldots, N\}$. In some embodiments, different action objects overlap with each other. For example, two events occur simultaneously, and both need to be shown to audiences. All cameras capture all views from all characters from various angles in various scenes. Then a camera optimization process calculates the optimal camera path to capture the character performance. The camera optimization process takes the stage performance data $\{p_t | t=1, 2, \ldots, T\}$ as input to calculate an optimal camera setting represented by $\{c_t | t=1, 2, \ldots, T\}$ for each time t. In some embodiments, the camera setting includes at least one of a camera path or a camera parameter. The camera optimization is performed on the discrete data from time t to T. The camera setting $\{c_t | t=1, 2, \ldots, T\}$ represents all admissible camera selections at each time slot from time t to T and for each time slot, only one camera can be selected in the camera optimization process.

In some embodiments, the camera optimization process identifies the camera path with minimal distortion D. The distortion D is calculated based on a cost function derived from the cinematography guidelines. Then, a video represented by $\{f_t | t=1, 2, \ldots, T\}$ corresponding to the stage performance data $\{p_t | t=1, 2, \ldots, T\}$ is generated based on the optimized camera setting.

Because the camera optimization process only minimizes the errors from the aesthetics perspective, the script-to-movie generation device consistent with the present disclosure also considers the fidelity of the generated video to the movie script. On one hand, the fidelity needs to be evaluated in an objective measurement. On the other hand, the fidelity measurement needs to be incorporated into the camera optimization process for minimizing the aesthetic distortion. Thus, the generated video is evaluated and is outputted after the generated video satisfies a pass condition that ensures the quality of the outputted video. When either the aesthetics or the fidelity of the generated video is determined to be unacceptable, one or more iterations of at least one of the camera optimization process or the stage performance process take place to generate another video with adjusted camera setting and/or character performance.

In some embodiments, when a camera is identified as causing the generated video not satisfying the pass condition, a corresponding cost associated with the identified camera would be maximized for a subsequent iteration of the camera optimization process or the stage performance process. In other words, the identified camera is taken out from the cameras capturing the stage performance.

In some embodiments, a video understanding process takes a candidate video $\{f_t | t=1, 2, \ldots, T\}$ as input to generate another action list including a list of performed actions. The action list recognized by the video understanding process is represented by $\{a'_i | i=1, 2, \ldots, N\}$, where $a'_i$ is ith action object that contains information for one or more virtual characters in a scene of the stage performance and N is the total number of action objects performed by various characters in various scenes of the stage performance. Then, an arbitrator process compares the action similarity between the action list $\{a_i | i=1, 2, \ldots, N\}$ and the action list $\{a'_i | i=1,$ 2, . . . , N} to obtain a fidelity error E. The fidelity error E is used to quantify the consistency between the visual perception of the generated video and the textual meaning of the movie script. At the same time, the arbitrator process also considers the aesthetic distortion D when evaluating the candidate video {$f_t$|t=1, 2, . . . , T}. When the candidate video {$f_t$|t=1, 2, . . . , T} is not qualified given the obtained D and E, a wider scope of admissible settings for cameras and character action performance will be considered to redo the optimization calculation, and then redo the arbitration. This iteration will be repeated until the candidate video {$f_t$|t=1, 2, . . . , T} is qualified or the count of iterations reaches a pre-configured count threshold.

In some embodiments, after the action similarity between the action list {$a_i$|i=1, 2, . . . , N} and the action list {$a'_i$|i=1, 2, . . . , N} is compared, all actions in the action list {$a_i$|i=1, 2, . . . , N} are sorted by the action similarity. In a case that the stage performance needs to be optimized, the action with highest similarity from the sorted list is selected for remaking.

Figure 5:
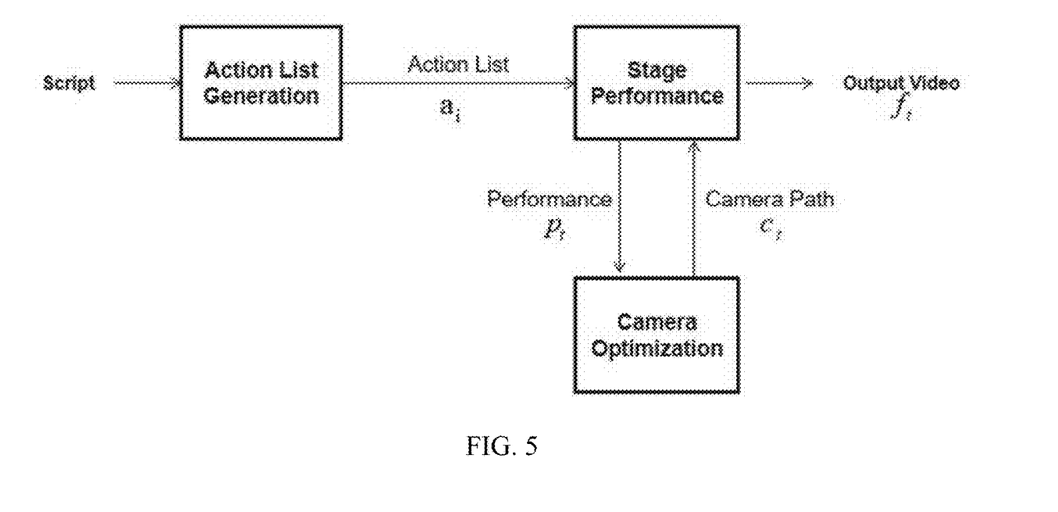
FIG. 5 illustrates a schematic functional diagram of another exemplary script-to-movie generation device according to some embodiments of the present disclosure.

FIG. 5 illustrates a schematic functional diagram of another exemplary script-to-movie generation device according to some embodiments of the present disclosure. The script-to-movie generation device shown in FIG. 5 is similar to the script-to-movie generation device shown in FIG. 1. The difference is the omission of the video understanding process and arbitration process. The previous description can be referred to for the specific implementation, which will not be repeated herein.

In the embodiments of the present disclosure, the script-to-movie generation device leverages the recent advances in natural language processing, computational cinematography, and video understanding to dramatically reduce the time and knowledge required for the script-to-movie generation process. By incorporating a novel hybrid objective evaluation mechanism that considers both the comprehensibility of visual presentation of the movie script and the compliance of cinematography guidelines, the video generation process has been mapped into an optimization problem that aims to produce better quality videos. Dynamic programming has been considered to solve the optimization problem and achieve an optimal solution with the most efficient computation complexity. Thus, the script-to-movie generation device consistent with the present disclosure substantially expedites the movie production process.

Figure 2:
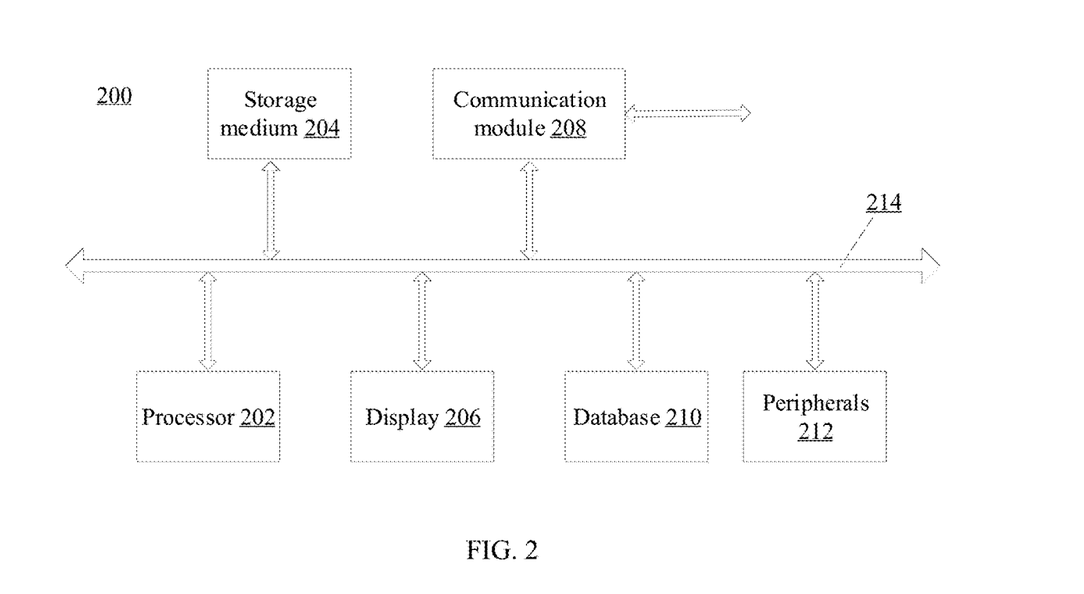
FIG. 2 illustrates a schematic structural diagram of an exemplary script-to-movie generation device according to some embodiments of the present disclosure.

FIG. 2 illustrates a schematic structural diagram of an exemplary script-to-movie generation device according to some embodiments of the present disclosure. As shown in FIG. 2, the computing device 200 may include a processor 202, a storage medium 204, a display 206, a communication module 208, a database 210, and peripherals 212, and one or more bus 214 to couple the devices together. Certain devices may be omitted and other devices may be included.

The processor 202 may include any appropriate processor or processors. Further, the processor 202 can include multiple cores for multi-thread or parallel processing. Processor 202 may execute sequences of computer program instructions or program modules to perform various processes, such as requesting user input of directorial hints on a graphical user interface, generating/rendering an animated video, translating directorial hints for editing optimization of the animated video, etc. The storage medium 204 may include memory modules, such as ROM, RAM, flash memory modules, and erasable and rewritable memory, and mass storages, such as CD-ROM, U-disk, and hard disk, etc. The storage medium 204 may store computer program instructions or program modules for implementing various processes, when executed by the processor 202.

Further, the communication module 208 may include network devices for establishing connections through a communication network. The database 210 may include one or more databases for storing certain data (e.g., images, videos, animation materials) and for performing certain operations on the stored data, such as database searching and data retrieving.

The display 206 may include any appropriate type of computer display device or electronic device display (e.g., CRT or LCD based devices, touch screens, LED display). The peripherals 212 may include various sensors and other I/O devices, such as speaker, camera, motion sensors, keyboard, mouse, etc.

In operation, the computing device 200 can perform a series of actions to implement the disclosed auto-cinematography method and framework. The computing device 200 can implement a terminal or a server, or a combination of both. A terminal, as used herein, may refer to any appropriate user terminal with certain computing capabilities including, e.g., collecting user-entered directorial hints, displaying preview videos, performing editing optimization on a video. For example, a terminal can be a personal computer (PC), a workstation computer, a server computer, a hand-held computing device (tablet), a mobile terminal (a mobile phone or a smartphone), or any other user-side computing device. A server, as used herein, may refer to one or more server computers configured to provide certain server functionalities, such as determining camera configurations for shooting an animated video, generating the animated video based on the camera configurations, editing the animated video by finding a path with minimum cost function in a graph model. The server may also include one or more processors to execute computer programs in parallel. The terminal and/or the server may be configured to provide structures and functions for such actions and operations. In some embodiments, some part of the actions may be performed on the server, and other part of the actions may be performed on the terminal.

Figure 3:
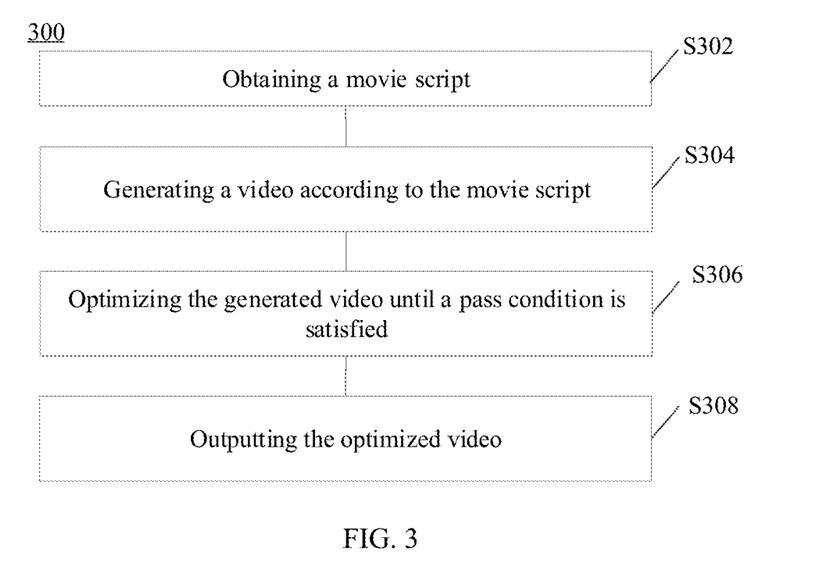
FIG. 3 illustrates a flow chart of an exemplary script-to-movie generation method according to some embodiments of the present disclosure.

The present disclosure also provides a script-to-movie generation method. FIG. 3 illustrates a flow chart of an exemplary script-to-movie generation method according to some embodiments of the present disclosure. The method may be implemented by a computing device, such as the device 200 shown in FIG. 2. As shown in FIG. 3, the method includes the following processes.

At S302, a movie script is obtained.

Specifically, the movie script is used to generate a video corresponding to the movie script.

At S304, a video is generated according to the movie script.

Specifically, generating the video according to the movie script includes generating a list of first actions according to the movie script, generating stage performance based on each action in the list of first actions, and using one or more cameras to capture the video of the stage performance. In some embodiments, the list of first actions is a chronological action list including the actions intended to show the visual presentation of the movie script. The list of first actions is represented by {$a_i$|i=1, 2, . . . , N}, where $a_i$ is ith action object that contains information for one or more virtual characters in a scene of the stage performance and N is the total number of action objects performed by various characters in various scenes of the stage performance.

In some embodiments, the stage performance represented by {$p_t$|t=1, 2, . . . , T} is generated based on each action in the action list $\{a_i|i=1, 2, \ldots, N\}$, where $p_t$ is the stage performance by a character at time t and T is a total performance time. In some embodiments, the stage performance corresponding to each action $a_i$ is represented by $$\{p_{t_{a_i}}, \ldots, p_{t+1_{a_i}}, \ldots, p_{t+l_{a_{i}}_{a_i}}\},$$

where $l_{a_i}$ is the action duration of $a_i$, and $t_{a_i}$ and $t_a^i$ and $l_{a_i}$ are fixed values derived from the action list $\{a_i|i=1, 2, \ldots, N\}$.

In some embodiments, one or more cameras capture a candidate video $\{f_t|t=1, 2, \ldots, T\}$ from the stage performance $\{p_t|t=1, 2, \ldots, T\}$. The one or more cameras are tactically deployed and bounded to each character in the stage performance.

At S306, the generated video is optimized until a pass condition is satisfied. The optimization process may be performed according to an aesthetic evaluation and a fidelity evaluation of the video.

Specifically, optimizing the generated video until the pass condition is satisfied includes evaluating a total aesthetic distortion D on the video captured by the one or more cameras from the stage performance, generating a list of second actions based on the video captured by the one or more cameras from the stage performance, determining a fidelity error E between the list of first actions and the list of second actions, and iteratively optimizing camera setting and character performance to minimize the total aesthetic distortion D such that the pass condition is satisfied. The pass condition includes that the fidelity error E is smaller than or equal to a pre-configured fidelity error threshed $Th_E$ is satisfied or a count of minimization iterations reaches a pre-configured count threshold.

In some embodiments, the total aesthetic distortion D of the candidate video $\{f_t|t=1, 2, \ldots, T\}$ captured by the one or more cameras from the stage performance $\{p_t|t=1, 2, \ldots, T\}$ is evaluated.

In some embodiments, the total aesthetic distortion D includes character visibility $V(c_t)$ for a character kin the camera setting $\{c_t|t=1, 2, \ldots, T\}$. The character visibility $V(c_t)$ is evaluated by calculating $\Sigma_{k=0}^{K}=I(c_t,k)\cdot r_k \cdot r_k$ is a ratio of a size of the character kin a current video frame over a total size of the current video frame. $r_k$ represents how easily the audience perceives the character k in a video frame. When multiple characters appear in the view of the camera $c_t$, the camera $c_t$ considers its bounded character as the most significant one. $I(c_t,k)$ depends on the camera $c_t$ and the character k, and represents a correlation between the camera $c_t$ and the character k given different weights to different characters and different camera combinations. A low value of $I(c_t,k)$ indicates that the character k is a more significant character of the camera $c_t$.

In some embodiments, the total aesthetic distortion D further includes character action $A(c_t)$. The character action $A(c_t)$ describes whether the character k is acting at time t. The audience is more likely to notice the characters in motion. If the character k is acting at time t, it is more likely that the character k bounded camera $c_t$ is selected. For example, $A(c_t)$ may be obtained according to the following formula:

$$A(c_t) = \begin{cases} 0, & \text{camera } c_t \text{ bounded character } k \text{ has action at time } t \\ 1, & \text{otherwise} \end{cases}$$

In some embodiments, the total aesthetic distortion D further includes camera configuration $C(c_t,ã_t)$ for the camera $c_t$. The camera configuration $C(c_t,ã_t)$ is evaluated by calculating $\phi_C(p_{c_t},d_{c_t},ã_t)$, where $p_{c_i}$ is a camera position, $d_{c_i}$ is a shooting direction, $ã_t$ is an action object at time t, and $\phi_C()$ is a distortion cost function for the camera configuration.

Different camera configurations serve different purposes in the film making. For example, medium shots are used most frequently when the character is performing general actions. When the character performs a specific action, such as view around, long shots, surround environment camera, and person of view camera are often the better options. On the other hand, different actions may need the camera to shoot from different directions. For example, walking and running actions can be shot from both the front and the rear of the character with minimal distortion. However, speaking action may be distorted more substantially when being shot from the rear of the character than when being shot from the front and the side of the character. Thus, the camera configuration distortion depends on action type derived from the action object (i.e., $a_t$) at time t, and the camera position p and the shooting direction d derived from the camera $c_t$.

In some embodiments, the total aesthetic distortion D further includes screen continuity $S(c_t,c_{t-1})$ including a summary of each single character position change in the current video frame. The screen continuity $S(c_t,c_{t-1})$ is evaluated by calculating $\Sigma_{k=0}^{K}v(k,c_t)\cdot\phi_S(p(k,c_t)-p(k,c_{t-1}))$, where $p(k,c_t)$ and $p(k,c_{t-1})$ refer to positions of the character k in the current video frame captured by the camera $c_t$ and the camera $c_{t-1}$, $v(k,c_t)=1$ when the character k appears in a view of the camera $c_t$, $v(k,c_t)=0$ otherwise, and $\phi_S()$ is a penalty of the character position change as a non-linear function of a distance between the character position $p(k,c_t)$ and the character position $p(k,c_{t-1})$.

The visual-spatial continuity in the video prevents video viewers from feeling disoriented. For example, the cinematography guidelines include a 180-degree rule. The minimum penalty of the position change is 0 and increases as a distance between the character position $p(k,c_t)$ and the character position $p(k,c_{t-1})$ increases. When the character k only appears in one of the video frames, the maximum penalty 1 is applied.

In some embodiments, the total aesthetic distortion D further includes moving continuity $M(c_t,c_{t-1})$ including a character moving direction change caused by the character action before or after the view of the camera $c_t$ changes. The moving continuity $M(c_t,c_{t-1})$ is evaluated by calculating $\Sigma_{k=0}^{K}v(k,c_t)\cdot\phi_M(m(k,c_t)-m(k,c_{t-1}))$, where $m(k,c_t)$ and $m(k,c_{t-1})$ refer to the character moving direction vectors in the current video frame at time t and time t−1 captured by the camera $c_t$ and the camera $c_{t-1}$, and $\phi_M()$ is a penalty of the character moving direction change as a non-linear function of a difference between the character moving direction vector $m(k,c_t)$ and the character moving direction vector $m(k,c_{t-1})$. The penalty increases as the motion direction vectors diverge from each other. When the character k only appears in one the video frames, the maximum penalty 1 is applied.

In some embodiments, the total aesthetic distortion D further includes shot duration distortion $U(\bar{u}, c_t, c_{t-1}, \ldots, c_{t-q})$. The shot duration distortion $U(\bar{u}, c_t, c_{t-1}, \ldots, c_{t-q})$ is evaluated by calculating $\phi_U(\bar{u}, c_t, c_{t-1}, \ldots, c_{t-q})$, where $\bar{u}$ is an average shot duration set for each scene, q is the longest allowable shot duration, and $\phi_U()$ is a penalty of the shot duration for the video frames in a range of $[t-q, \ldots, t]$ that change cameras.

Shot duration is closely related to the concentration of the audience's attention. In general, the shorter the shot duration, the more intense the content in the video, and the easier it is to attract the audience's attention. In some embodiments, an average shot duration $\bar{u}$ is configured for each scene in the shot duration distribution. In some other embodiments, shot durations learned from exiting movies are configured for various scenes in the shot duration distribution.

After various distortions are aggregated, the total aesthetic distortion $D = \Sigma_{t=0}^{T}[\omega_0 \cdot V\ (c_t) + \omega_1 \cdot C(c_t, \tilde{a}_t) + \omega_2 \cdot A(c_t) + \omega_3 \cdot S\ (c_t, c_{t-1}) + \omega_4 \cdot M(c_t, c_{t-1})] + \Sigma_{t=q}^{T}(1-\omega_0-\omega_1-\omega_2-\omega_3-\omega_4) U(\bar{u}, c_t, c_{t-1}, \ldots, c_{t-q})$. The $\omega_0$, $\omega_1$, $\omega_2$, $\omega_3$, and $\omega_4$ are weights for each distortion component in a range between 0 and 1.

In some embodiments, the list of second actions is generated according to the stage performance. Specifically, one or more cameras capture a candidate video $\{f_t | t=1, 2, \ldots, T\}$ from the stage performance $\{p_t | t=1, 2, \ldots, T\}$. Then, the list of second actions is generated according to the candidate video $\{f_t | t=1, 2, \ldots, T\}$. The list of second actions is a chronological actions list including a list of performed actions and is represented by $\{a'_i | i=1, 2, \ldots, N\}$, where $a'_i$ is ith action object that contains information for one or more virtual characters in a scene of the stage performance and N is the total number of action objects performed by various characters in various scenes of the stage performance.

In some embodiments, the fidelity error E between the list of first actions and the list of second actions is determined, and camera setting and character performance are optimized to minimize the total aesthetic distortion D such that the pass condition (e.g., that the fidelity error E is smaller than or equal to a pre-configured fidelity error threshold $Th_E$) is satisfied.

Specifically, the action similarity between the action list $\{a_i | i=1, 2, \ldots, N\}$ and the action list $\{d_i | i=1, 2, \ldots, N\}$ is compared to obtain a fidelity error E. The fidelity error E is used to quantify the consistency between the visual perception of the generated video and the textual meaning of the movie script. At the same time, the aesthetic distortion D is also considered when evaluating the candidate video $\{f_t | t=1, 2, \ldots, T\}$. When the fidelity error E is smaller than or equal to a pre-configured fidelity error threshold $Th_E$ is satisfied, the candidate video $\{f_t | t=1, 2, \ldots, T\}$ is qualified. When the candidate video $\{f_t | t=1, 2, \ldots, T\}$ is not qualified given the obtained D and E, a wider scope of admissible settings for cameras and character action performance will be considered to redo the optimization calculation, and then recalculate the fidelity error E. This iteration will be repeated until the candidate video $\{f_t | t=1, 2, \ldots, T\}$ is qualified or the count of iterations reaches a pre-configured count threshold.

In some embodiments, the fidelity error E between the generated video and the movie script can be approximated and evaluated by the difference between the action list derived from the movie script and the action list derived from the candidate video by a video understanding process. The video understanding process reads the candidate video and outputs an action list recognized from the candidate video. In general, the video understanding process can do an equally good job as human, and the action list generation process can understand the movie script thoroughly. Then, the approximation for the fidelity error E using the action list difference comparison is feasible. The fidelity errors mainly contributed by either the character performance or the camera shooting process. In the former case, the character performance does not trigger human natural intuition to reflect the actions specified in the movie script. In the latter case, the view matching the meaning specified in the movie script is absent. In practical applications, errors may be introduced in the video understanding process and the action list generation process. However, in the embodiments of the present disclosure, the errors introduced in the video understanding process and the action list generation process are not considered.

In some embodiments, a measurement called action difference $d_i$ is used to represent the difference between the textual description of two correlated actions $a_i$ and $a'_i$. The arbitrator process generates the vector forms of the two description by using GloVe word embedding model, and then calculates the difference between the two vectors as $$d_i = 1 - \frac{G(a_i) \cdot G(a'_i)}{\|G(a_i)\| \cdot \|G(a'_i)\|},$$

where G( ) is the GloVe word embedding model. As such, the fidelity error E can then be described by the equation $E = \Sigma_{i=0}^{N} d_i$. By defining a function W( ) that $W(t) = d_t$ when time t is equal to the starting time of $a_i$, otherwise $W(t)=0$, then the above equation can be transformed into $E = \Sigma_{t=0}^{T} W(t)$.

In some embodiments, the camera setting is optimized to minimize the total aesthetic distortion D. Specifically, camera placement is optimized for different shot sizes, different profile angles, and different camera heights. A plurality of virtual cameras are placed surrounding each bounded character. Each camera maintains a relative position from the bounded character.

Positioning cameras in a three-dimensional space to shoot videos that meet two-dimensional constraints is a 7-degree-of-freedom problem including camera's position, orientation, and focal length (i.e., shot size). In practical applications, the optimization of the 7 dimensions may consume substantial computation power. To simplify the problem without losing generality, the 7-degree-of-freedom infinite search space is reduced to countable discrete camera configurations according to the camera placement of classic movies.

Figure 4A:
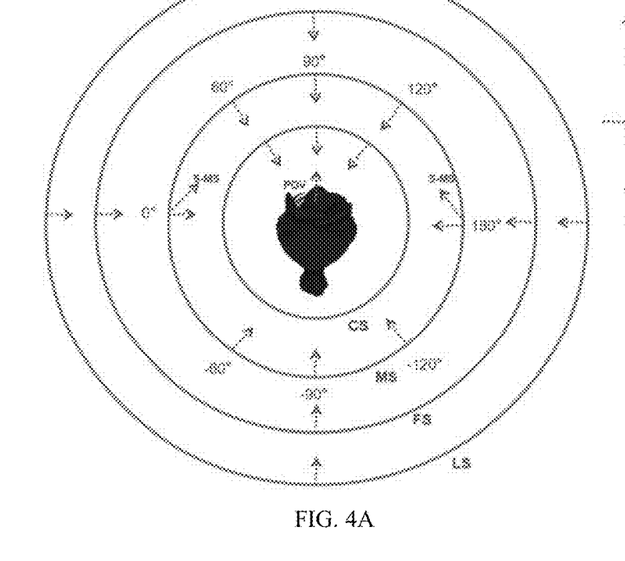
FIG. 4A and FIG. 4B illustrate schematic diagrams of camera placement according to some embodiments of the present disclosure.
Figure 4B:
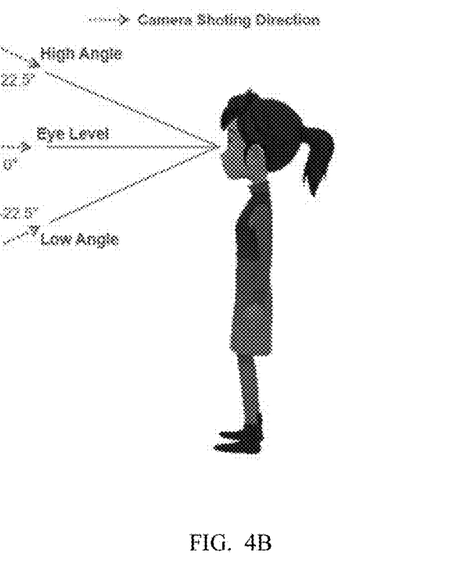

In some embodiments, only camera use with up to two characters are considered because the shots with more two characters in the view can often be replaced by single character shots. A toric model of two-character shots is considered. FIG. 4A and FIG. 4B illustrate schematic diagrams of camera placement according to some embodiments of the present disclosure. Each camera that maintains the relative position from the character bounding with the camera during the stage performance is called point of view (POV) camera. The POV camera follow the head movement of the bounded character.

In some embodiments, as shown in FIG. 4A, each character is bounded to 34 cameras in the stage performance process. Each camera is labeled with an index number. The 34 cameras include 1 POV camera (index 0), 3 Close-up Shot (CS) cameras (indexes 1-3), 20 Medium Shot (MS) cameras (indexes 4-23), 2 environment Medium Shot (MS-S) cameras (indexes 24-25), 4 Full Shot (FS) cameras (indexes 26-29), and 4 Long Shot (LS) cameras (indexes 30-33). A profile angle (i.e., a shooting direction) of each camera is indicated by individual dotted line arrow in FIG. 4A. Among the 34 cameras, 8 MS cameras (indexes 4-11) and 2 MS-S cameras are deployed at an eye level (FIG. 4B) of the character with the relative positions (i.e., dotted line arrows at 0°, 60°, 90°, 120°, 180°, −120°, −90°, −60°) shown in FIG. 4A, 6 MS cameras (indexes 12-17) are deployed at a high angle (FIG. 4B) of the character with the relative positions (i.e., dotted line arrows at 60°, 90°, 120°, −120°, −90°, −60°) shown in FIG. 4A, and another 6 MS cameras (indexes 18-23) are deployed at a low angle (FIG. 4B) of the character with the relative positions (i.e., dotted line arrows at 0°, 60°, 90°, 120°, 180°, −120°, −90°, −60°) shown in FIG. 4A. The 2 MS-S cameras configured to observe the surroundings in front of the character have the profile angles shown in FIG. 4A.

In some embodiments, Lagrange multiple method is used to relax the recognized error constraint, so that the relaxed problem can be solved using a shortest path algorithm. Lagrange cost function is $J_\lambda(c_t,a_t)=D+\lambda \cdot E$, where $\lambda$ is a Lagrange multiplier. If there exists a $\lambda^*$ such that $$\{c_t^*, a_t^*\} = \underset{c_t,a_t}{\operatorname{argmin}} J_\lambda^*(c_t, a_t),$$

which leads to $E=Th_E$. Then, $\{c^*_t, a^*_t\}$ is an optimal solution to the equation $\min(\Sigma_{t=0}^T [\omega_0 \cdot V(c_t)+\omega_1 \cdot C(c_t,a_t)+\omega_2 \cdot A(c_t)+\omega_3 \cdot S(c_t,c_{t-1})+\omega_4 \cdot M(c_t,c_{t-1})]+\Sigma_{t=q}^T (1-\omega_0-\omega_1-\omega_2-\omega_3-\omega_4)U(\bar{u}, c_t, c_{t-1}, \ldots, c_{t-q}))$ such that $\Sigma_{t=0}^T W(t) \leq Th_E$. Therefore, the task of solving the above equation is equivalent to the easier task of finding the optimal solution to the unconstrained problem that minimizes Lagrange cost function $J_\lambda(c_t,a_t)$ and choosing the appropriate Lagrange multiplier to satisfy the constraint.

In some embodiments, $z_k=(c_k, a_k)$ and a cost function $G_T(z_{T-q}, \ldots, z_T)$ are defined to represent a minimum of the fidelity error E and the total aesthetic distortion D up to and including the kth video frame, given that $z_{k-q}, \ldots, z_t$ are decision vectors for the (k-q)th to kth video frame. Therefore $G_T(z_{T-q}, \ldots, z_T)$ represents the minimum total of the fidelity error E and the total aesthetic distortion D for all the video frames, and thus $$\min_z J_\lambda(z) = \min_{z_{T-q}, \ldots, z_T} G_T(z_{T-q}, \ldots, z_T).$$

In some embodiments, the key observation for deriving an efficient algorithm is the fact that given q+1 decision vectors $z_{k-q-1}, \ldots, z_{k-1}$ for the (k−q−1)st to (k−1)st video frames, and the cost function $G_{k-1}(z_{k-q-1}, \ldots, z_{k-1})$, the selection of the next decision vector $z_k$ is independent of the selection of the previous decision vectors $z_1, z_2, \ldots, z_{k-q-2}$. This means that the cost function can be expressed recursively as $$G_k(z_{k-q}, \ldots, z_k) = \min_{z_{k-q-1}, \ldots, z_{k-1}} G_{k-1}(z_{k-q-1}, \ldots, z_{k-1}) + \sum_{t=0}^T W(t) +$$

$$\lambda \cdot \left\{ \sum_{t=0}^T [\omega_0 \cdot V(c_t) + \omega_1 \cdot C(c_t, a_t) + \omega_2 \cdot A(c_t) + \omega_3 \cdot S(c_t, c_{t-1}) + \omega_4 \cdot M(c_t, c_{t-1})] + \sum_{t=q}^T (1 - \omega_0 - \omega_1 - \omega_2 - \omega_3 - \omega_4)U(\bar{u}, c_t, c_{t-1}, \ldots, c_{t-q}) \right\}$$

At S308, the optimized video is outputted.

Specifically, after the optimization process consistent with the present disclosure is performed on the video, the quality of the optimized video is improved. Outputting the optimized video concludes the script-to-movie process.

The recursive representation of the cost function above makes the future step of the optimization process independent of its past steps, which is the foundation of dynamic programming. The problem can be converted into a graph theory problem of finding the shortest path in a directed acyclic graph (DAG). The computation complexity of the algorithm is $O(T \times |Z|^{q+1})$ (where Z is a total number of performances available in the stage performance $\{p_t|t=1, 2, \ldots, T\}$ for all the actions described in the action list $\{a_i|i=1, 2, \ldots, N\}$, and $|Z|$ is the carnality of Z), which depends directly on the value of q. For most cases, q is a small number, so the algorithm is much more efficient than an exhaustive search algorithm with exponential computation complexity.

In the embodiments of the present disclosure, the script-to-movie generation method leverages the recent advances in natural language processing, computational cinematography, and video understanding to dramatically reduce the time and knowledge required for the script-to-movie generation process. By incorporating a novel hybrid objective evaluation mechanism that considers both the comprehensibility of visual presentation of the movie script and the compliance of cinematography guidelines, the video generation process has been mapped into an optimization problem that aims to produce better quality videos. Dynamic programming has been considered to solve the optimization problem and achieve an optimal solution with the most efficient computation complexity. Thus, the script-to-movie generation method consistent with the present disclosure substantially expedites the movie production process.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A script-to-movie generation method for a computing device, comprising:
   obtaining a movie script;
   generating a video according to the movie script;
   optimizing the generated video until a pass condition is satisfied; and
   outputting the generated video,
   wherein generating the video according to the movie script includes:
   generating a list of first actions according to the movie script;
   generating stage performance based on each action in the list of first actions; and
   using one or more cameras to capture the video of the stage performance.

2. The method according to claim 1, wherein optimizing the generated video until the pass condition is satisfied includes:
   evaluating a total aesthetic distortion D on the video captured by the one or more cameras from the stage performance;
   generating a list of second actions based on the video captured by the one or more cameras from the stage performance;
   determining a fidelity error E between the list of first actions and the list of second actions; and iteratively optimizing camera setting and character performance to minimize the total aesthetic distortion D such that the pass condition is satisfied, wherein the pass condition includes that the fidelity error E is smaller than or equal to a pre-configured fidelity error threshold $Th_E$ is satisfied or a count of minimization iterations reaches a pre-configured count threshold.

3. The method according to claim 2, wherein:
each action in the list of first actions and the list of second actions includes attributes such as a subject, an action, an object, an action duration, a subject start position, a subject end position, a subject emotion, and an action style.

4. The method according to claim 2, wherein:
the list of first actions is represented by a chronological action list $\{a_i | i=1, 2, \ldots, N\}$; and
the list of second actions is represented by a chronological action list $\{a'_i | i=1, 2, \ldots, N\}$;
wherein $a_i$ or $a'_i$ is ith action object that contains information for one or more virtual characters in a scene of the stage performance and N is the total number of action objects performed by various characters in various scenes of the stage performance.

5. The method according to claim 4, wherein:
the stage performance is represented by $\{p_t | t=1, 2, \ldots, T\}$, wherein $p_t$ is the stage performance by a character at time t and T is a total performance time; and
the stage performance corresponding to $a_i$ is represented by $$\left\{ p_{t_{a_i}}, \ldots, p_{t+1_{a_i}}, \ldots, p_{t+l_{a_{i_{a_i}}}} \right\},$$

wherein $l_{a_i}$ is the action duration of $a_i$, and $t_{a_i}$ and $l_{a_i}$ are fixed values derived from the list of first actions.

6. The method according to claim 5, wherein:
the camera setting optimized for $\{p_t | t=1, 2, \ldots, T\}$ is represented by $\{c_t | t=1, 2, \ldots, T\}$; and
a video corresponding to $\{p_t | t=1, 2, \ldots, T\}$ is represented by $\{f_t | t=1, 2, \ldots, T\}$.

7. The method according to claim 6, wherein evaluating the total aesthetic distortion D on the video captured by the one or more cameras from the stage performance includes:
evaluating character visibility $V(c_t)$ for a character k in the camera setting $\{c_t | t=1, 2, \ldots, T\}$ by calculating $\Sigma_{k=0}^{K} = I(c_t, k) \cdot r_k$, wherein $r_k$ is a ratio of a size of the character k in a current video frame over a total size of the current video frame, $l(c_t, k)$ refers to a relationship between the character k and the camera $c_t$, and a low value of $l(c_t, k)$ indicates that the character k is the more significant character of the camera $c_t$;
evaluating a character action $A(c_t)$ to be 0 when the character k bounded to the camera $c_t$ performs an action at time t or be 1 otherwise;
evaluating a camera configuration $C(c_t, \tilde{a}_t)$ for the camera $c_t$ by calculating $\phi_C(p_{c_t}, d_{c_t}, \tilde{a}_t)$, wherein $p_{c_t}$ is a camera position, $d_{c_t}$ is a shooting direction, $\tilde{a}_t$ is an action object at time t, and $\phi_C(\ )$ is a distortion cost function for the camera configuration;
evaluating screen continuity $S(c_t, c_{t-1})$ including a summary of each single character position change in the current video frame by calculating $\Sigma_{k=0}^{K} v(k, c_t) \cdot \phi_S(p(k, c_t) - p(k, c_{t-1}))$, wherein $p(k, c_t)$ and $p(k, c_{t-1})$ refer to positions of the character k in the current video frame captured by the camera $c_t$ and the camera $c_{t-1}$, $v(k, c_t) = 1$ when the character k appears in a view of the camera $c_t$, $v(k, c_t) = 0$ otherwise, and $\phi_S(\ )$ is a penalty of the character position change as a non-linear function of a distance between the character position $p(k, c_t)$ and the character position $p(k, c_{t-1})$;
evaluating moving continuity $M(c_t, c_{t-1})$ including a character moving direction change caused by the character action before or after the view of the camera $c_t$ changes by calculating $\Sigma_{k=0}^{K} v(k, c_t) \cdot \phi_M(m(k, c_t) - m(k, c_{t-1}))$, wherein $m(k, c_t)$ and $m(k, c_{t-1})$ refer to the character moving direction vectors in the current video frame at time t and time t-1 captured by the camera $c_t$ and the camera $c_{t-1}$, and $\phi_M(\ )$ is a penalty of the character moving direction change as a non-linear function of a difference between the character moving direction vector $m(k, c_t)$ and the character moving direction vector $m(k, c_{t-1})$; and
evaluating a shot duration distortion $U(\bar{u}, c_t, c_{t-1}, \ldots, c_{t-q})$ by calculating $\phi_U(\bar{u}, c_t, c_{t-1}, \ldots, c_{t-q})$, wherein $\bar{u}$ is an average shot duration set for each scene, q is the longest allowable shot duration, and $\phi_U(\ )$ is a penalty of the shot duration for the video frames in a range of $[t-q, \ldots, t]$ that change cameras;
wherein the total aesthetic distortion $D = \Sigma_{t=0}^{T} [\omega_0 \cdot V(c_t) + \omega_1 \cdot C(c_t, \tilde{a}_t) + \omega_2 \cdot A(c_t) + \omega_3 \cdot S(c_t, c_{t-1}) + \omega_4 \cdot M(c_t, c_{t-1})] + \Sigma_{t=q}^{T} (1 - \omega_0 - \omega_1 - \omega_2 - \omega_3 - \omega_4) U(\bar{u}, c_t, c_{t-1}, \ldots, c_{t-q})$, and $\omega_0, \omega_1, \omega_2, \omega_3$, and $\omega_4$ are weights for each distortion component in a range between 0 and 1.

8. The method according to claim 7, wherein determining the fidelity error E between the list of first actions and the list of second actions includes:
determining an action difference $d_i$ between textual description of the list of first actions and the list second actions by calculating $$1 - \frac{G(a_i) \cdot G(a'_i)}{\|G(a_i)\| \cdot \|G(a'_i)\|},$$

wherein $G(\ )$ is a GloVe word embedding model;
defining a function $W(t) = d_t$ when time t is equal to starting time of $a_i$ and $W(t) = 0$ otherwise; and
calculating $\Sigma_{t=0}^{T} W(t)$, wherein T is a total performance time.

9. The method according to claim 8, wherein optimizing the camera setting to minimize the total aesthetic distortion D includes:
optimizing camera placement for different shot sizes, different profile angles, and different camera heights by placing a plurality of cameras surrounding and bounding with each character, each camera maintaining a relative position from the bounded character.

10. The method according to claim 9, wherein iteratively optimizing camera setting and character performance to minimize the total aesthetic distortion D such that the pass condition is satisfied includes:
$\min(\Sigma_{t=0}^{T} [\omega_0 \cdot V(c_t) + \omega_1 \cdot C(c_t, \tilde{a}_t) + \omega_2 \cdot A(c_t) + \omega_3 \cdot S(c_t, c_{t-1}) + \omega_4 \cdot M(c_t, c_{t-1})] + \Sigma_{t=q}^{T} (1 - \omega_0 - \omega_1 - \omega_2 - \omega_3 - \omega_4) U(\bar{u}, c_t, c_{t-1}, \ldots, c_{t-q}))$ such that $\Sigma_{t=0}^{T} W(t) \leq Th_E$.

11. The method according to claim 10, wherein:
defining $J_\lambda(c_t, a_t) = D + \lambda \cdot E$, wherein $\lambda$ is a Lagrange multiplier; and
$\min(\Sigma_{t=0}^{T} [\omega_0 \cdot V(c_t) + \omega_1 \cdot C(c_t, \tilde{a}_t) + \omega_2 \cdot A(c_t) + \omega_3 \cdot S(c_t, c_{t-1}) + \omega_4 \cdot M(c_t, c_{t-1})] + \Sigma_{t=q}^{T} (1 - \omega_0 - \omega_1 - \omega_2 - \omega_3 - \omega_4) U(\bar{u}, c_t, c_{t-1}, \ldots, c_{t-q}))$ such that $\Sigma_{t=0}^{T} W(t) \leq Th_E$ is reduced to $\min J_\lambda(c_t, a_T)$.

12. The method according to claim 11, wherein:
defining $z_k = (c_k, a_k)$;
defining a cost function $G_T(Z_{T-q}, \ldots, Z_T)$ to represent a minimum of the fidelity error E and the total aesthetic distortion D for all video frames; and $$\min_z J_\lambda(z) = \min_{z_{T-q}, \ldots, z_T} G_T(z_{T-q}, \ldots, z_T).$$

13. The method according to claim 12, wherein:

$$G_k(z_{k-q}, \ldots, z_k) = \min_{z_{k-q-1}, \ldots, z_{k-1}} G_{k-1}(z_{k-q-1}, \ldots, z_{k-1}) + \sum_{t=0}^{T} W(t) +$$

$$\lambda \cdot \left\{ \sum_{t=0}^{T} [\omega_0 \cdot V(c_t) + \omega_1 \cdot C(c_t, \bar{a}_t) + \omega_2 \cdot A(c_t) + \omega_3 \cdot S(c_t, c_{t-1}) + \omega_4 \cdot M(c_t, c_{t-1})] + \sum_{t=q}^{T} (1 - \omega_0 - \omega_1 - \omega_2 - \omega_3 - \omega_4) U(\bar{u}, c_t, c_{t-1}, \ldots, c_{t-q}) \right\}.$$

wherein:
  each future step of an optimization process is independent of a past step thereof;
  the optimization process is converted into a graph theory problem of finding a shortest path in a directed acyclic graph; and
  a computation complexity of the optimization process is $O(T \times |Z|^{q+1})$, and I smore efficient than an exhaustive search algorithm with exponential computation complexity.

14. A script-to-movie generation device comprising:
a memory storing program instructions; and
a processor coupled with the memory and configured to execute the program instructions to:
obtaining a movie script;
generating a video according to the movie script, comprising:
  generate a list of first actions according to the movie script;
  generate stage performance based on each action in the list of first actions; and
  use one or more cameras to capture the video of the stage performance;
optimizing the generated video until a pass condition is satisfied; and
outputting the generated video.

15. The device according to claim 14, wherein the processor is further configured to:
  evaluate a total aesthetic distortion D on the video captured by the one or more cameras from the stage performance;
  generate a list of second actions based on the video captured by the one or more cameras from the stage performance;
  determine a fidelity error E between the list of first actions and the list of second actions; and
  iteratively optimize camera setting and character performance to minimize the total aesthetic distortion D such that the pass condition is satisfied, wherein the pass condition includes that the fidelity error E is smaller than or equal to a pre-configured fidelity error threshold $Th_E$ is satisfied or a count of minimization iterations reaches a pre-configured count threshold.

16. The device according to claim 15, wherein:
each action in the list of first actions and the list of second actions includes attributes such as a subject, an action, an object, an action duration, a subject start position, a subject end position, a subject emotion, and an action style.

17. The device according to claim 15, wherein:
the list of first actions is represented by a chronological action list $\{a_i | i=1, 2, \ldots, N\}$; and
the list of second actions is represented by a chronological action list $\{a'_i | i=1, 2, \ldots, N\}$;
wherein $a_i$ or $a'_i$ is ith action object that contains information for one or more virtual characters in a scene of the stage performance and N is the total number of action objects performed by various characters in various scenes of the stage performance.

18. The device according to claim 17, wherein:
the stage performance is represented by $\{p_t | t=1, 2, \ldots, T\}$, wherein $p_t$ is the stage performance by a character at time t and T is a total performance time; and
the stage performance corresponding to $a_i$ is represented by $$\left\{ p_{t_{a_i}}, \ldots, p_{t+1_{a_i}}, \ldots, p_{t+l_{a_{i_{a_i}}}} \right\},$$

wherein $l_{a_i}$ is the action duration of $a_i$, and $t_{a_i}$ and are fixed values derived from the list of first actions.

* * * * *